(12) United States Patent
Takechi (10) Patent No.: US 8,820,669 B2
(45) Date of Patent: Sep. 2, 2014

(54) DUAL-BEARING REEL

(75) Inventor: Kunio Takechi, Osaka (JP)

(73) Assignee: Shimano Inc., Osaka (JP)

(*) Notice: Subject to any disclaimer, the term of this patent is extended or adjusted under 35 U.S.C. 154(b) by 73 days.

(21) Appl. No.: 13/569,908

(22) Filed: Aug. 8, 2012

(65) Prior Publication Data

US 2013/0075512 A1  Mar. 28, 2013

(30) Foreign Application Priority Data

Sep. 27, 2011  (JP) .................................. 2011-211081

(51) Int. Cl.
*A01K 89/01* (2006.01)
*A01K 89/0155* (2006.01)

(52) U.S. Cl.
CPC .................................. *A01K 89/0155* (2013.01)
USPC ........... 242/303; 242/286; 242/302; 242/321; 242/310

(58) Field of Classification Search
USPC ......... 242/245, 260, 286, 302, 303, 304, 310, 242/321
See application file for complete search history.

(56) References Cited

U.S. PATENT DOCUMENTS

| 4,943,012 | A | * | 7/1990 | Aoki | 242/290 |
| 5,127,603 | A | * | 7/1992 | Morimoto | 242/279 |
| 6,047,913 | A | * | 4/2000 | Yamaguchi et al. | 242/310 |
| 6,206,311 | B1 | * | 3/2001 | Kim et al. | 242/288 |
| 6,336,605 | B1 | * | 1/2002 | Littau et al. | 242/289 |
| 6,460,793 | B1 | * | 10/2002 | Hirayama et al. | 242/313 |
| 6,481,657 | B1 | * | 11/2002 | Oishi et al. | 242/289 |
| 7,374,120 | B2 | * | 5/2008 | Hyun | 242/289 |
| 8,235,320 | B2 | * | 8/2012 | Kawasaki | 242/310 |
| 2003/0209621 | A1 | * | 11/2003 | Maeda et al. | 242/321 |
| 2004/0075005 | A1 | * | 4/2004 | Myojo et al. | 242/310 |
| 2007/0181728 | A1 | * | 8/2007 | Kawasaki | 242/310 |

FOREIGN PATENT DOCUMENTS

JP  2009-044990 A  3/2009

* cited by examiner

*Primary Examiner* — Emmanuel M Marcelo
(74) *Attorney, Agent, or Firm* — Global IP Counselors (57) ABSTRACT

A dual-bearing reel includes a reel unit, a handle, a spool shaft, a spool, and a casting control mechanism. The handle is rotatably supported by the reel unit. The spool shaft is rotatably supported at an end thereof by the shaft support part. The spool is mounted onto the spool shaft, where the spool is configured to be rotated in conjunction with rotation of the handle. The casting control mechanism includes a brake knob rotatably supported by the shaft support part, a first plate being disposed to be contactable with the brake knob and one of end surfaces of the spool shaft, and a second plate being disposed to be contactable with the other of end surfaces of the spool shaft. The brake knob is disposed entirely in the recess. The first plate is configured to be pressed in conjunction with rotation of the brake knob.

6 Claims, 9 Drawing Sheets

DUAL-BEARING REEL

CROSS-REFERENCE TO RELATED APPLICATIONS

This application claims priority to Japanese Patent Application No. 2011-211081 filed on Sep. 27, 2011. The entire disclosure of Japanese Patent Application No. 2011-211801 is hereby incorporated herein by reference.

BACKGROUND

1. Field of the Invention

The present invention relates to a dual-bearing reel, particularly to a dual-bearing reel that a brake knob of a casting control mechanism is disposed on an opposite side of a handle attachment side.

2. Background Art

In dual-bearing reels, a brake knob of a casting control mechanism is normally disposed on a handle attachment side. In some well-known dual-bearing reels, in contrast, the brake knob is disposed on the opposite side of the handle attachment side (see e.g., Japan Laid-open Patent Application Publication No. JP-A-2009-44990). In such a well-known dual-bearing reel, the brake knob includes a knob member and a screw member. The screw member is mounted to the knob member while being unitarily rotatable therewith and axially movable with respect thereto. With the structure, the screw member is configured to be moved back and forth in conjunction with turning of the knob member. Further, a brake plate is pressed by the screw member and a spool shaft is thereby braked. When turned, the knob member is not moved back and forth. In other words, the knob member is not axially moved with respect to a reel unit on the handle attachment side. Therefore, a clearance is kept constant between the reel unit and the knob member and this can prevent foreign objects from entering the inside of the knob member.

SUMMARY

In the well-known dual-bearing reel, it is possible to prevent intrusion of foreign objects into the knob member. However, the brake knob protrudes from the handle attachment side of the reel unit. In some instances of using a dual-bearing reel, either a spool or a fishing rod is operated while the reel unit is palmed. More specifically, the opposite side of the handle attachment side of the reel unit is held. In palming the reel unit, the reel unit is held together with the fishing rod by the opposite hand of the hand holding a handle (i.e., "the opposite hand" is the left hand when the dual-bearing reel is of a right-handed type). In the well-known dual-bearing reel, the brake knob makes contact with the palm of the hand holding the brake knob in palming the reel unit. Therefore, it is awkward to perform palming.

It is an advantage of the present invention to make it easy to perform palming in a dual-bearing reel that a brake knob is disposed on the opposite side of the handle attachment side.

A dual-bearing reel is provided. The dual-bearing reel includes a reel unit, a handle, a spool shaft, a spool, a casting control mechanism. The reel unit includes a frame, a first cover having a recess, the first cover covering a first side of the frame, a second cover covering a second side of the frame, and a shaft support part attached to the frame on a first cover side. The handle is supported by the reel unit on a second cover side. The spool shaft is rotatably supported at an end thereof by the shaft support part, where the spool shaft has two end surfaces. The spool is mounted onto the spool shaft, where the spool is configured to be rotated in conjunction with rotation of the handle. The casting control mechanism includes a brake knob rotatably supported by the shaft support part, where the brake knob is disposed entirely in the recess, a first plate being disposed to contactable with the brake knob and one of the end surfaces of the spool shaft, where the first plate is configured to be pressed in conjunction with rotation of the brake knob, and a second plate being contactable with the other of end surfaces of the spool shaft.

BRIEF DESCRIPTION OF THE DRAWINGS

Referring now to the attached drawings which form a part of this original disclosure.

DETAILED DESCRIPTION OF THE PREFERRED EMBODIMENTS

First Exemplary Embodiment

Structure of Dual-Bearing Reel

Figure 1:
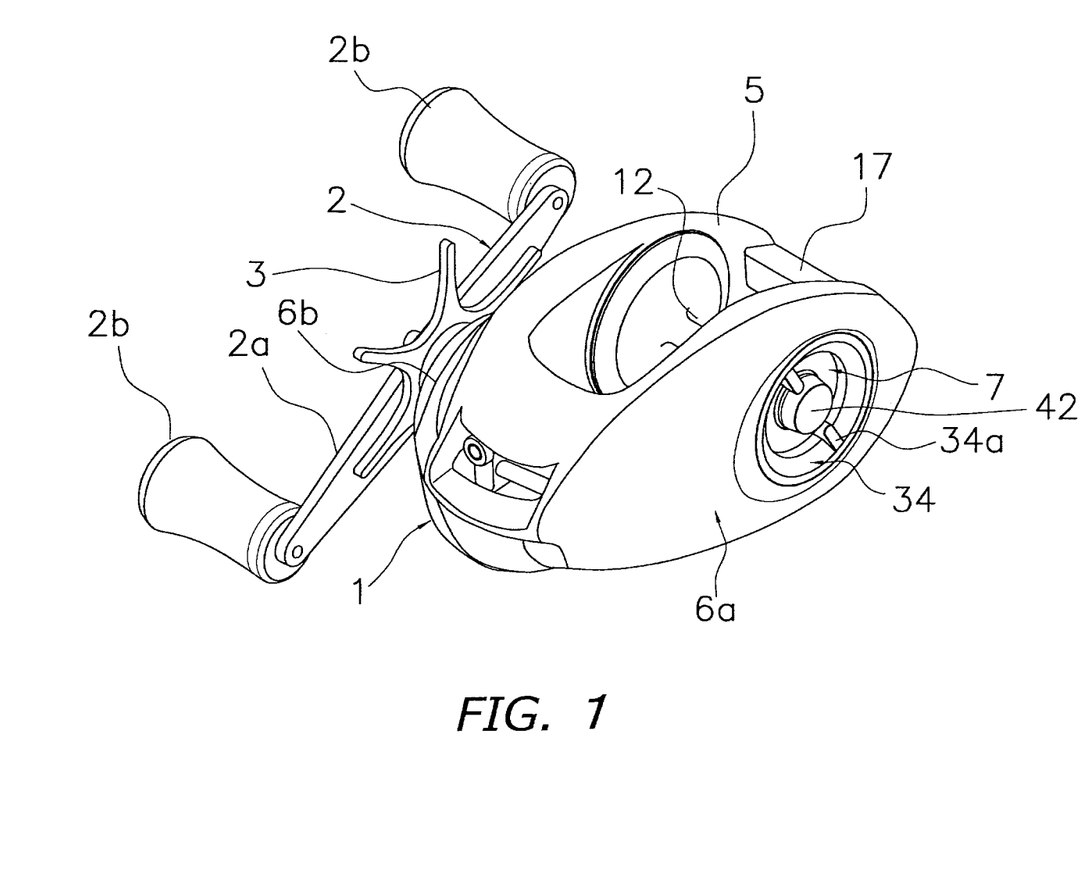
FIG. 1 is a perspective view of a dual-bearing reel according to a first exemplary embodiment of the present invention.

In FIG. 1, a dual-bearing reel according to a first exemplary embodiment of the present invention is a low profile reel. The dual-bearing reel includes a reel unit 1, a handle 2 for rotating a spool, and a spool 12 for winding a fishing line. The handle 2 is disposed laterally to (e.g., on the left side of) the reel unit 1. The spool 12 is rotatably and detachably attached to the inside of the reel unit 1. Further, a drag regulation member 3 is disposed on the reel unit 1 side of the handle 2 in order to regulate drag.

Figure 2:
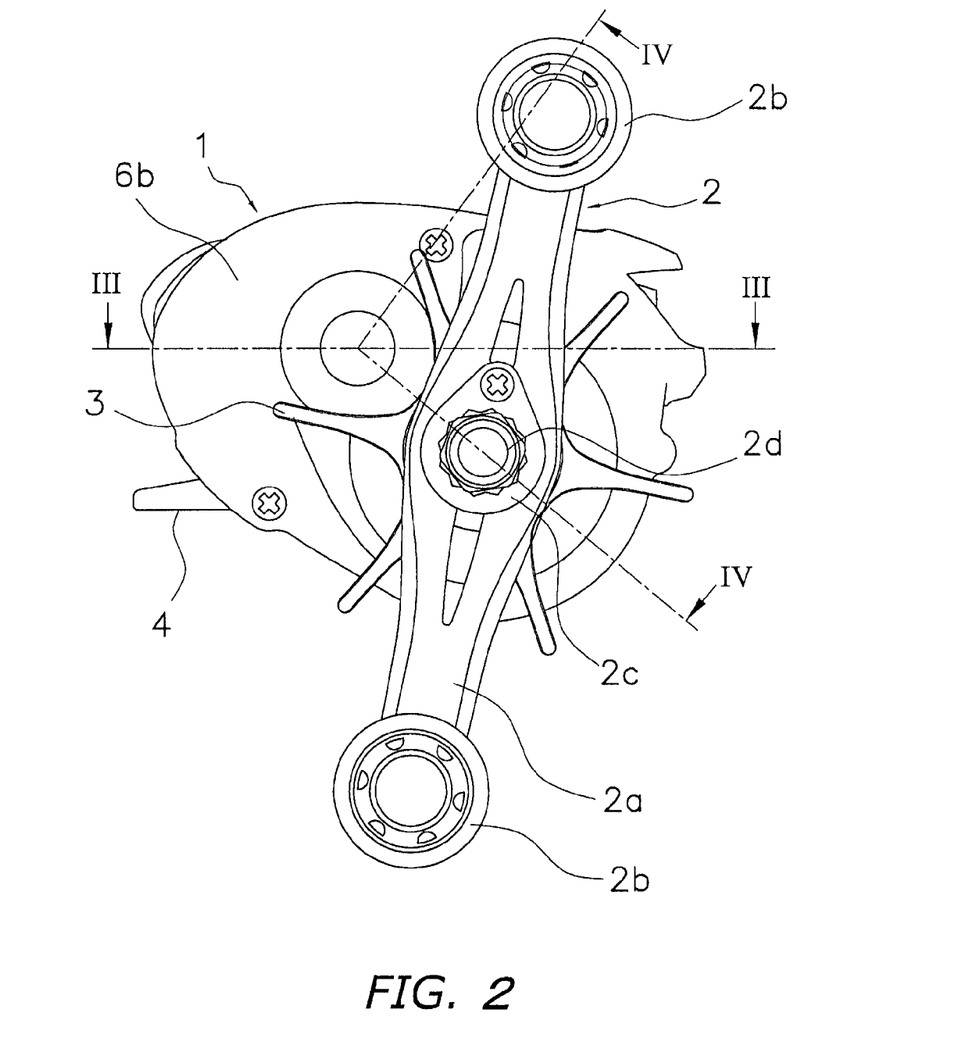
FIG. 2 is a side view of the dual-bearing reel seen from a handle attachment side.

The handle 2 is of a double-handle type including a handle arm 2a and two knob portions 2b. The handle arm 2a is a plate-shaped member made of, for instance, metal. The knob portions 2b are rotatably attached to the both ends of the handle arm 2a. As illustrated in FIG. 2, the handle arm 2a is non-rotatably fixed to a tip of a handle shaft 30 by a nut 2d. Rotation of the nut 2d is prevented by a retainer 2c fixed to the outer surface of the handle arm 2a by a screw.

Figure 3:
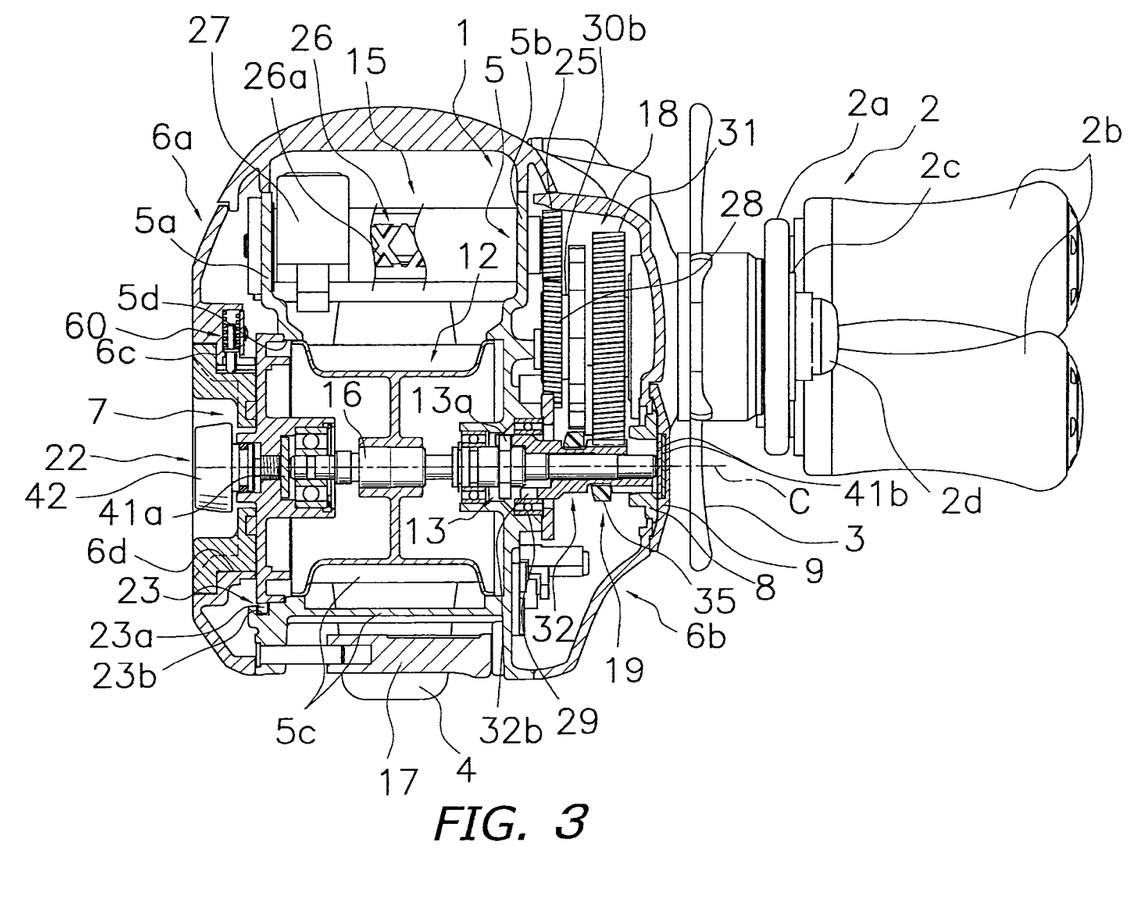
FIG. 3 is a cross-sectional view of FIG. 2 sectioned along a cutting line III-III.
Figure 4:
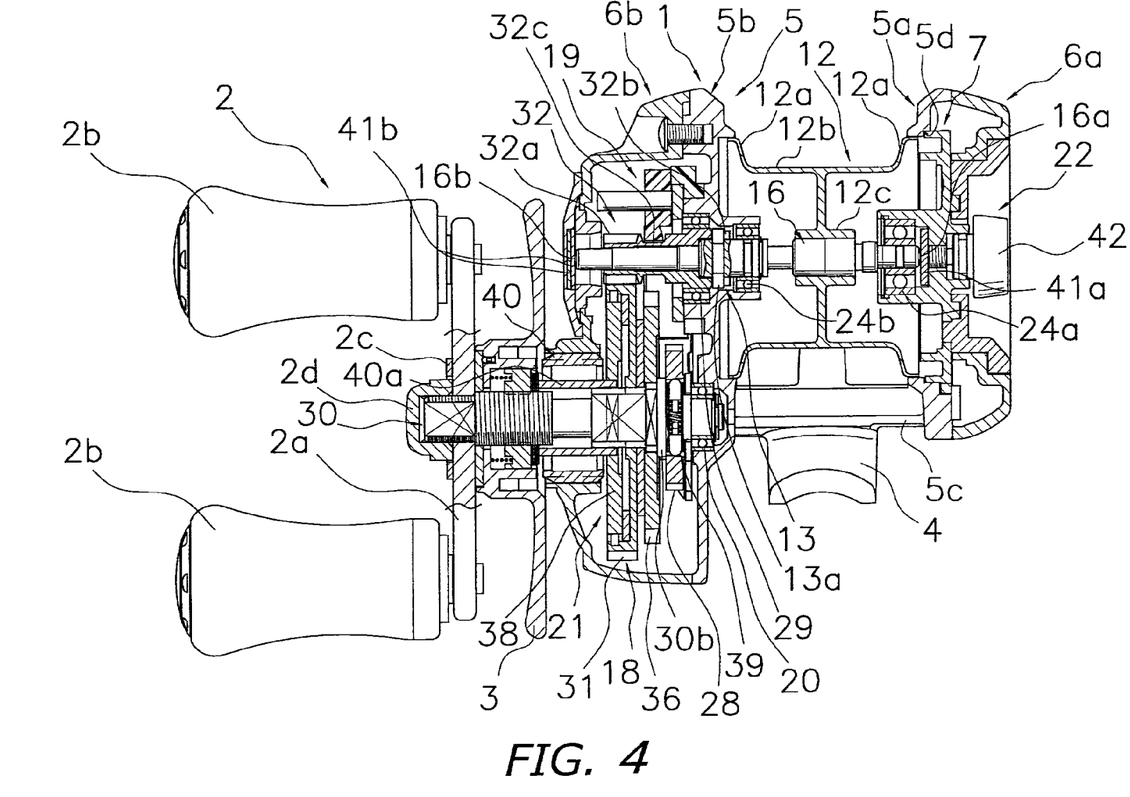
FIG. 4 is a cross-sectional view of FIG. 2 sectioned along a cutting line IV-IV.

As illustrated in FIGS. 3 and 4, the reel unit 1 includes a frame 5, a first side cover 6a, a second side cover 6b, and a shaft support part 7. The first and second side covers 6a and 6b are attached to the both lateral sides of the frame 5 for laterally covering the frame 5. The shaft support part 7 is detachably attached to a lateral part of the frame 5. The first side cover 6a (an exemplary first cover) is disposed on the opposite side of the handle 2 while the second side cover 6b (an exemplary second cover) is disposed on the attachment side of the handle 2.

The frame 5 is a member made of light metal (e.g., aluminum alloy, magnesium alloy, etc.) and includes a first side plate 5a, a second side plate 5b, and a plurality of coupling portions 5c. The first and second side plates 5a and 5b are opposed at a predetermined interval. The coupling portions 5c couple the first and second side plates 5a and 5b. The shaft support part 7 is detachably attached to the first side plate 5a disposed on the opposite side of the handle attachment side. The first side plate 5a includes a circular opening 5d for allowing the spool 12 to pass therethrough. The shaft support part 7 is detachably attached to the opening 5d by, for instance, a bayonet mechanism 23 in order to take out the spool 12 from the opening 5d side. Further, a fishing rod attachment leg 4 is integrally formed with two bottom-side coupling portions 5c. The fishing rod attachment leg 4 is a member elongated back and forth for attaching the dual-bearing reel to a fishing rod.

The first side cover 6a is a member made of light metal (e.g., aluminum alloy, magnesium alloy, etc.) and covers the outside of the first side plate 5a. The first side cover 6a has a circular recess 6c in the center part thereof. The recess 6c is recessed in a plurality of stages. The recess 6c has a circular knob opening 6d in the center part thereof. The shaft support part 7 is exposed to the outside through the knob opening 6d. The first side cover 6a is interposed and held by the shaft support part 7 and is thereby detachably attached to the frame 5 together with the shaft support part 7. In a position radially outwards of the shaft support part 7, a positioning mechanism 60 is disposed on the inner peripheral part of the knob opening 6d of the first side cover 6a. The positioning mechanism 60 is configured to prevent rotation of the shaft support part 7 of a non-operated state and appropriately position the shaft support part 7 of an operated state.

The second side cover 6b is a member made of light metal (e.g., aluminum alloy, magnesium alloy, etc.) and is fixed to the second side plate 5b of the frame 5 by screws. The second side cover 6b includes a boss portion 8 and a lid member 9. The boss portion 8 is disposed in a position where a spool shaft 16 is disposed. The lid member 9 closes an opening of the boss portion 8. The boss portion 8 is fixed to the second side cover 6b by, for instance, swaging. The lid member 9 is fixed to the second side cover 6b by screws. The inner diameter of the boss portion 8 is slightly greater than the outer diameter of a gear portion 32a of a pinion gear 32 to be described. Therefore, the gear portion 32a can enter the inner peripheral side of the boss portion 8.

The shaft support part 7 is rotatably attached to the first side cover 6a while interposing and holding the first side cover 6a between components thereof. Therefore, the shaft support part 7 is prevented from being detached from the first side cover 6a. Further, the shaft support part 7 is detachably attached to the first side plate 5a by the bayonet mechanism 23 as illustrated in FIG. 3. The bayonet mechanism 23 includes a plurality of (e.g., three) plate-shaped protruding portions 23a and a plurality of (e.g., three) groove-shaped engaging recesses 23b. The protruding portions 23a protrude radially outwards from the outer periphery of the shaft support part 7 while being circumferentially aligned at predetermined intervals on the outer periphery of the shaft support part 7. The engaging recesses 23b are formed outside the opening 5d of the first side plate 5a for engaging with the protruding portions 23a. The shaft support part 7 is turned and attached to the first side plate 5a by the bayonet mechanism 23. Accordingly, the first side cover 6a is also attached to the first side plate 5a.

Figure 5:
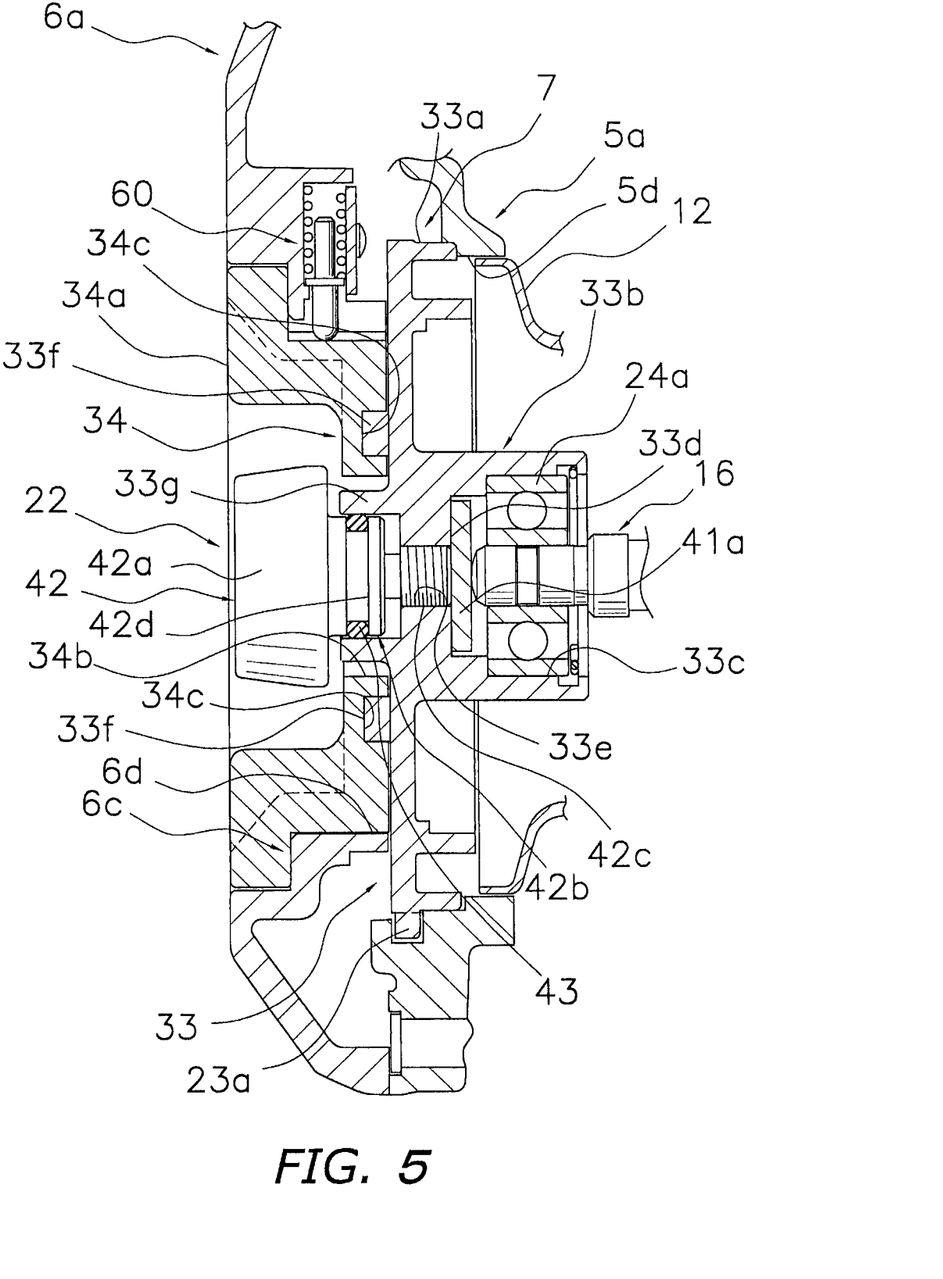
FIG. 5 is a partial cross-sectional view of the dual-bearing reel on a first side cover side.

As illustrated in FIG. 5, the shaft support part 7 includes a bearing mounting portion 33 and an attachment-detachment operating portion 34. The bearing mounting portion 33 is a portion where a first bearing 24a is mounted. The attachment-detachment operating portion 34, together with the bearing mounting portion 33, interposes and holds the first side cover 6a therebetween in a relatively rotatable state. The bearing mounting portion 33 is a saucer-shaped member. An outer periphery 33a of the bearing mounting portion 33 is fitted into the opening 5d. Further, the outer periphery 33a has the plural protruding portions 23a of the bayonet mechanism 23. The protruding portions 23a protrude radially outwards from the outer periphery 33a while being circumferentially aligned about the axis of the spool 12 at predetermined intervals. The bearing mounting portion 33 has a tubular bearing accommodation portion 33b in the center part thereof. The bearing accommodation portion 33b protrudes towards the spool 12 in a tubular shape for accommodating the first bearing 24a. The bearing accommodation portion 33b has a stepped tubular mounting space 33c for mounting the first bearing 24a to the inner peripheral surface thereof. A disc-shaped first plate 41a, forming a part of a casting control mechanism 22 to be described, is attached to a bottom portion 33d of the mounting space 33c. The bottom portion 33d has a female threaded portion 33e that a brake knob 42 to be described is screwed. The bearing mounting portion 33 has a plurality of (e.g., two) positioning convex portions 33f on the surface thereof that makes contact with the attachment-detachment operating portion 34. The positioning convex portions 33f protrude in parallel to the axis of the spool 12 while being circumferentially aligned about the axis of the spool shaft 16 at predetermined intervals. The bearing mounting portion 33 has a tubular seal arrangement portion 33g protruding axially outwards on the outer surface thereof.

As illustrated in FIG. 5, the attachment-detachment operating portion 34 is a stepped cylindrical member fixed to the bearing mounting portion 33 by a screw member (not illustrated in the figures). The attachment-detachment operating portion 34 serves to perform an attachment-detachment operation of the shaft support part 7. The outer surface of the attachment-detachment operating portion 34 is slightly recessed than that of the first side cover 6a. The attachment-detachment operating portion 34 has a rib 34a disposed on the diameter thereof for performing an attachment-detachment operation. The rib 34a has a shape further protruding radially inwards and axially outwards than the other part of the attachment-detachment operating portion 34. The attachment-detachment operating portion 34 has an opening 34b in the center part thereof. The seal arrangement portion 33g protrudes into the opening 34b. Further, the attachment-detachment operating portion 34 has a plurality of (e.g., two) positioning recesses 34c on the wall surface thereof (i.e., the bearing mounting portion 33 side wall surface). The positioning convex portions 33f are engaged with the positioning recesses 34c.

As illustrated in FIGS. 3 and 4, the frame 5 accommodates the spool 12 for winding a fishing line, a level winding mechanism 15, and a clutch operating member 17. The spool 12 can be disposed along a direction perpendicularly to a fishing rod. The level winding mechanism 15 is configured to uniformly wind the fishing line onto the spool 12. The clutch operating member 17 functions as a thumb pad in thumbing the fishing line. Further, a gear mechanism 18, a clutch mechanism 13, a clutch control mechanism 19, a drag mechanism 21, and the casting control mechanism 22 are disposed between the frame 5 and the second side cover 6b. The gear mechanism 18 is configured to transfer rotational force from the handle 2 to the spool 12 and the level winding mechanism 15. The clutch control mechanism 19 is configured to execute an on/off control of the clutch mechanism 13. The drag mechanism 21 is configured to brake rotation of the spool 12 in a fishing-line releasing direction. The casting control mechanism 22 is configured to regulate resistive force to be applied during rotation of the spool 12.

As illustrated in FIG. 4, the spool 12 has a pair of saucer-shaped flanges 12a on the both lateral parts thereof. Further, the spool 12 has a tubular bobbin trunk 12b between the flanges 12a. Yet further, the spool 12 has a tubular boss 12c integrally formed with a substantially axial center part of the inner periphery of the bobbin trunk 12b. The spool 12 is non-rotatably fixed onto the spool shaft 16 penetrating the boss 12c by, for instance, serration coupling. The method of fixing the spool 12 onto the spool shaft 16 is not limited to the serration coupling and a variety of coupling methods (e.g., key coupling, spline coupling, etc.) can be herein employed instead.

The spool shaft 16 extends to the second side cover 6b while penetrating through the second side plate 5b. The spool shaft 16 is rotatably supported by the reel unit 1 through the first bearing 24a and a second bearing 24b on the axially both sides of the boss 12c of the spool 12. The first bearing 24a is mounted to the shaft support part 7, while the second bearing 24b is mounted to the second side plate 5b. A first end surface 16a (an example of "one end surface") and a second end surface 16b (an example of "the other end surface") of the spool shaft 16 respectively protrude and formed in either a chevron shape or a circular-arc shape. The first and second end surfaces 16a and 16b of the spool shaft 16 can make contact with the casting control mechanism 22.

An engaging pin 13a, which forms a part of the clutch mechanism 13, is fixed to a part of the spool shaft 16 that penetrates through the second side plate 5b. The engaging pin 13a penetrates through the spool shaft 16 along its diameter, while the both ends thereof radially protrude from the spool shaft 16. The tip (i.e., the right end in FIG. 2) of the pinion gear 32 to be described can be engaged with the both protruding ends of the engaging pin 13a.

As illustrated in FIG. 3, the level winding mechanism 15 includes a second gear 25, a traverse cam shaft 26, and a fishing line guide 27. The second gear 25 is meshed with a first gear 28 of the gear mechanism 18 to be described. The traverse cam shaft 26 is a shaft member having helical grooves 26a intersecting with each other on the outer peripheral surface thereof. The fishing line guide 27 is engaged with the helical grooves 26a. The fishing line guide 27 is configured to reciprocate in parallel to and in front of the spool 12 in conjunction with rotation of the traverse cam shaft 26.

The gear mechanism 18 includes the handle shaft 30, a driving gear 31, the pinion gear 32, and the first gear 28. The driving gear 31 is rotatably mounted onto the handle shaft 30. The pinion gear 32 is a tubular gear to be meshed with the driving gear 31. The first gear 28 is meshed with the second gear 25 while being mounted onto the handle shaft 30. The handle shaft 30 is prevented from rotating in the fishing-line releasing direction by a roller-type one-way clutch 40. In other words, the handle shaft 30 is allowed to rotate only in the fishing-line winding direction. The one-way clutch 40 is mounted to the second side cover 6b. The base end of the handle shaft 30 is rotatably supported by the second side plate 5b through a bearing 20. A ratchet wheel 36 is disposed on the rear side (i.e., the left side in FIG. 3) of the driving gear 31 while being mounted onto the handle shaft 30 in a unitarily rotatable state. The first gear 28 is disposed on the rear side of the ratchet wheel 36. The handle shaft 30 has a large-diameter contact portion 30b between its portion for mounting the ratchet wheel 36 and its portion for mounting the first gear 28. Rotation of the handle shaft 30 is transferred to the driving gear 31 through the drag mechanism 21.

As illustrated in FIG. 4, the pinion gear 32 extends axially outwards from the second side plate 5b. The pinion gear 32 is a tubular member that the spool shaft 16 penetrates through the center thereof. The pinion gear 32 is mounted onto the spool shaft 16 while being axially movable. The pinion gear 32 has the gear portion 32a, an engaging portion 32b, and a narrowed portion 32c. The gear portion 32a is formed on the base end of the pinion gear 32. The engaging portion 32b is formed on the tip end of the pinion gear 32 and can be engaged with the engaging pin 13a. The narrowed portion 32c is disposed between the gear portion 32a and the engaging portion 32b. The driving gear 31 is meshed with the gear portion 32a. The engaging pin 13a is engaged with the engaging portion 32b. A clutch yoke 35 of the clutch control mechanism 19 is engaged with the narrowed portion 32c. The pinion gear 32 is configured to be moved between a clutch-on position illustrated above a center line C in FIG. 3 and a clutch-off position illustrated below the center line C in FIG. 3 in conjunction with either an operation of the clutch operating member 17 or rotation of the handle 2 in the fishing-line winding direction. The pinion gear 32 is supported by the second side plate 5b through a bearing 29 while being rotatable and axially movable.

As illustrated in FIG. 4, the first gear 28 is coupled to the handle shaft 30 through a torque limiter 39. As illustrated in FIG. 3, the first gear 28 is meshed with the second gear 25 mounted onto the traverse cam shaft 26 of the level winding mechanism 15.

Torque Limiter Structure

Figure 6:
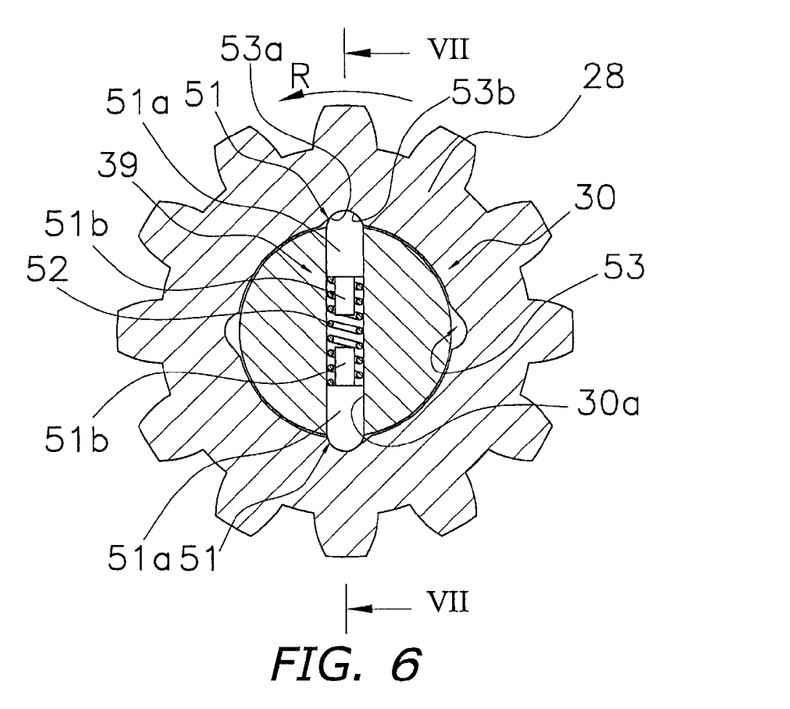
FIG. 6 is a cross-sectional view of a part of a handle shaft where a first gear is mounted.
Figure 7:
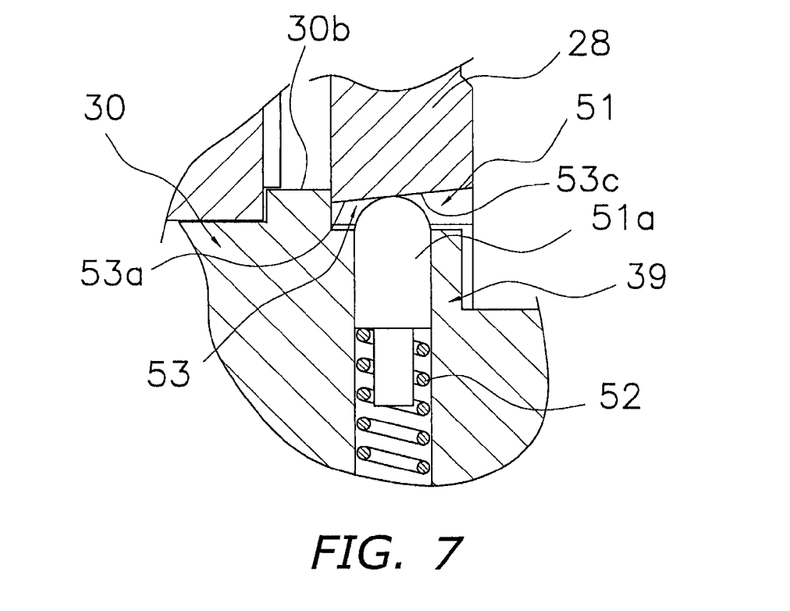
FIG. 7 is a partial cross-sectional view of FIG. 6 sectioned along a cutting line VII-VII.

The torque limiter 39 is provided for preventing excessive force from acting on the first gear 28 and the second gear 25 when the level winding mechanism 15 is broken down. As illustrated in FIGS. 6 and 7, the torque limiter 39 includes a pair of pin members 51, an urging member 52 and at least a locking recess 53. The pin members 51 are disposed in the handle shaft 30. The urging member 52 is, for instance, a coil spring for urging the paired pin members 51 towards the first gear 28. At least one locking recess 53 is formed on the inner peripheral surface of the first gear 28. In the present exemplary embodiment, four locking recesses 53 are formed thereon while being circumferentially aligned at predetermined intervals.

The handle shaft 30 includes a through hole 30a penetrating therethrough in a diameter direction for allowing the pin members 51 to be protrudably and retractably inserted therein. Each pin member 51 has a head portion 51a and a shaft portion 51b. The head portion 51a has a curved surface of a hemispheric cannonball shape, while the shaft portion 51b has a diameter smaller than that of the head portion 51a. The pin members 51 are disposed within the through hole 30a while the head portions 51a are directed to the locking recesses 53. The urging member 52 is disposed on the outer peripheral side of the shaft portions 51b of the paired pin members 51 while being compressed between the paired head portions 51a. Each locking recess 53 has a linear slope 53a and a cylindrical surface 53b. The slope 53a is disposed downstream in a rotational direction (i.e., a fishing-line winding direction) of the first gear 28 depicted with an arrow R, while the cylindrical surface 53b is disposed upstream in the rotation direction of the first gear 28. Therefore, rotation of the handle shaft 30 is normally transmitted to the first gear 28 when the pin members 51 press the slopes 53a. With the structure, the pin members 51 are configured to be retracted into the through hole 30a when excessive force acts on the first gear 28 by strongly rotating the handle 2 while foreign substance gets stuck in the level winding mechanism 15. Accordingly, the handle shaft 30 idles and this prevents the first gear 28 from being easily damaged or broken down. As illustrated in FIG. 7, the cylindrical surface 53b of each locking recess 53, which is contactable with one of the head portions 51a, has a slope 53c intersecting with the axis of the handle shaft 30. Each slope 53c is slanted for gradually getting closer to the axis of the handle shaft 30 towards the driving gear 31. With the structure, force of pressing the first gear 28 towards the handle 2 is produced when the pin members 51 urge the first gear 28. The first gear 28 is thereby urged towards the contact portion 30b and is prevented from being easily wobbled in its rotation.

The clutch mechanism 13 includes the engaging pin 13a and the engaging portion 32b of the pinion gear 32. The clutch mechanism 13 can be set to be in either of the clutch-on state and the clutch-off state in response to an operation of the clutch operating member 17. In the clutch-on state, rotation of the handle 2 is transmitted to the spool 12. In the clutch-off state, the spool 12 can be freely rotated.

As illustrated in FIGS. 1 and 3, the clutch operating member 17 is disposed rearwards of the spool 12 while being disposed in the rear part of the space interposed between the first side plate 5a and the second side plate 5b. The frame 5 has an elongated hole (not illustrated in the figures) in each of the first and second side plates 5a and 5b. The clutch operating member 17 is rotatably supported by the elongated holes. Therefore, the clutch operating member 17 can be slid up and down along the elongated holes.

The clutch control mechanism 19 includes the clutch yoke 35. The clutch yoke 35 is disposed on the outer peripheral side of the spool shaft 16. The clutch yoke 35 is supported by two pins (not illustrated in the figures) while being movable in parallel to the axis of the spool shaft 16. It should be noted that the spool shaft 16 can be rotated relatively to the clutch yoke 35. In other words, the clutch yoke 35 is configured not to be rotated even when the spool shaft 16 is rotated. Further, the clutch yoke 35 is movable right and left in FIG. 3 while the middle part thereof is engaged with the narrowed portion 32c of the pinion gear 32. The clutch yoke 35 is constantly urged in a clutch-on direction (i.e., inwards, more specifically, leftwards in FIG. 3) by a spring (not illustrated in the figures).

In the structure as described above, the pinion gear 32 is normally disposed in the inner clutch-on position while being engaged with the engaging pin 13a of the spool shaft 16. Thus, the clutch-on state is produced. When the pinion gear 32 is moved outwards by the clutch yoke 35, on the other hand, engagement between the pinion gear 32 and the engaging pin 13a is released. Thus, the clutch-off state is produced. The gear portion 32a of the pinion gear 32 is herein disposed on the inner peripheral side of the boss portion 8 as illustrated below an axis C in FIG. 3. Therefore, the pinion gear 32 is prevented from being easily wobbled in the clutch-off state.

As illustrated in FIG. 4, the drag mechanism 21 includes the drag regulation member 3, a pressure plate 38, and the one-way clutch 40. The drag regulation member 3 is used for an operation of regulating drag force. The pressure plate 38 is mounted onto the handle shaft 30 in a unitarily rotatable state. The one-way clutch 40 is mounted to the second side cover 6b while being disposed in the surrounding of the handle shaft 30. The pressure plate 38 is coupled to an inner race 40a of the one-way clutch 40 in a unitarily rotatable state. When the pressure plate 38 is pressed towards the driving gear 31 by an operation of rotating the drag regulation member 3, slippage is caused between the pressure plate 38 and the driving gear 31. The drag mechanism 21 is thus configured to brake the spool 12. To actuate the drag mechanism 21, the one-way clutch 40 is configured to prevent the handle shaft 30 from rotating in the fishing-line releasing direction.

Structure of Casting Control Mechanism

As illustrated in FIGS. 3 and 4, the casting control mechanism 22 includes the first plate 41a, second plates 41b, and the brake knob 42. The first and second plates 41a and 41b are disposed for holding and interposing therebetween the both ends of the spool shaft 16. The brake knob 42 serves to regulate force of the first and second plates 41a and 41b for holding and interposing therebetween the spool shaft 16.

As described above, the single first plate 41a is disposed on the left side (see FIG. 3) while being mounted to the bottom portion 33d of the mounting space 33c within the bearing mounting portion 33. The first plate 41a can make contact with a first end 16a of the spool shaft 16. The two second plates 41b are mounted to the inside of the boss portion 8 of the second side cover 6b.

As illustrated in FIG. 5, the brake knob 42 has an operating portion 42a, a seal attachment portion 42b, and a male threaded portion 42c. The operating portion 42a is a circular portion. The seal attachment portion 42b has a diameter smaller than that of the operating portion 42a. The male threaded portion 42c has a diameter smaller than that of the seal attachment portion 42b. In the present exemplary embodiment, the operating portion 42a has a circular truncated cone shape. The outer peripheral side of the operating portion 42a is disposed away from the attachment-detachment operating portion 34 at a clearance produced for operating the operating portion 42a. The brake knob 42 is disposed in the recess 6c of the first side cover 6a while being prevented from protruding from the outer surface of the first side cover 6a. In other words, the brake knob 42 is entirely located in the recess 6c. In the present exemplary embodiment, the attachment-detachment operating portion 34 is also disposed in the recess 6c. Therefore, the operating portion 42a is thus disposed away from the attachment-detachment operating portion 34 at the clearance. The seal attachment portion 42b has an annular seal attachment groove 42d. An O-ring 43 (an exemplary seal member) is attached onto the seal attachment groove 42d. The O-ring 43 is disposed for making contact with the inner peripheral surface of the seal arrangement portion 33g and the seal attachment groove 42d. The male threaded portion 42c is screwed into the female threaded portion 33e of the bearing mounting portion 33. The male threaded portion 42c can make contact with the first plate 41a.

Method of Operating Dual-Bearing Reel

The clutch yoke 35 is normally pressed inwards (leftwards in FIG. 3). The pinion gear 32 is thereby moved to an engaged position. The clutch-on state is herein produced while the pinion gear 32 and the engaging pin 13a of the spool shaft 16 are meshed. Rotational force from the handle 2 is herein transmitted to the spool 12 through the handle shaft 30, the driving gear 31, the pinion gear 32, and the spool shaft 16. The spool 12 is accordingly rotated in the fishing-line winding direction.

In fishing, braking force is regulated by the casting control mechanism 22 for inhibiting occurrence of backlash. In regulating braking force with the casting control mechanism 22, the brake knob 42 is turned in the clockwise direction for instance. The brake knob 42 thereby proceeds rightwards in FIG. 5 and the interval between the first plate 41a and the second plates 41b is reduced. Accordingly, braking force onto the spool shaft 16 is increased. In contrast, braking force is reduced by turning the brake knob 42 in the counterclockwise direction.

When regulation of braking force is finished, the clutch operating member 17 is pressed downwards. The clutch operating member 17 is herein moved to a downward disengaged position. Further, the clutch yoke 35 is moved outwards in conjunction with movement of the clutch operating member 17. The pinion gear 32, which is engaged with the clutch yoke 35, is also moved in the same direction as the clutch yoke 35. As a result, engagement between the pinion gear 32 and the engaging pin 13a of the spool shaft 16 is released and the clutch-off state is thereby produced. In the clutch-off state, rotation from the handle shaft 30 is not transmitted to the spool 12 and the spool shaft 16. Therefore, the spool 12 can be freely rotated. When the clutch-off state is thus produced, an angler drops the fishing line by tilting the reel for arranging the spool shaft 16 along a vertical plane while thumbing the fishing line wound about the spool 12 by the thumb of the hand holding and palming the first side cover 6a. The spool 12 is accordingly rotated in the fishing-line releasing direction by the weight of a terminal tackle and the fishing line is reeled out.

The brake knob 42 is herein disposed in the recess 6c of the first side cover 6a disposed oppositely to the handle 2 attachment side while being prevented from protruding from the first side cover 6a. In other words, the brake knob 42 is entirely located in the recess 6c Therefore, the brake knob 42 does not make contact with the angler's palm even when palming is executed on the first side cover 6a side. With the structure, palming can be easily executed on the opposite side of the handle 2 attachment side.

Further, the handle 2 is rotated in the fishing-line winding direction when a fish bites after the fishing line is reeled out. In response, rotation is transmitted from the first gear 28 to the second gear 25, and the fishing line guide 27 of the level winding mechanism 15 is reciprocated in front of the spool 12 along the spool shaft direction. Accordingly, the fishing line is uniformly wound about the spool 12. In actuating the level winding mechanism 15, the fishing line guide 27 may become immovable due to a factor such as attachment of foreign material onto the traverse cam shaft 26. When the handle 2 is herein forcibly rotated, large torque acts on the first gear 28 and the second gear 25. When a large amount of torque acts on the first gear 28 beyond its acceptable limit, the pin members 51 are retracted into the through hole 30a against the urging force of the urging member 52, and the handle shaft 30 is rotated with respect to the first gear 28. Accordingly, torque to be transmitted is restricted. In this case, members for restricting transmission torque, i.e., the pin members 51 and the urging member 52 are disposed on the handle shaft 30, and it is only required to form at least one recess 53 on the first gear 28. Therefore, the first gear 28 can be compactly formed.

Second Exemplary Embodiment

In the following explanation of a second exemplary embodiment and thereafter, structures and actions of elements similar to those of the first exemplary embodiment will be omitted.

Figure 8:
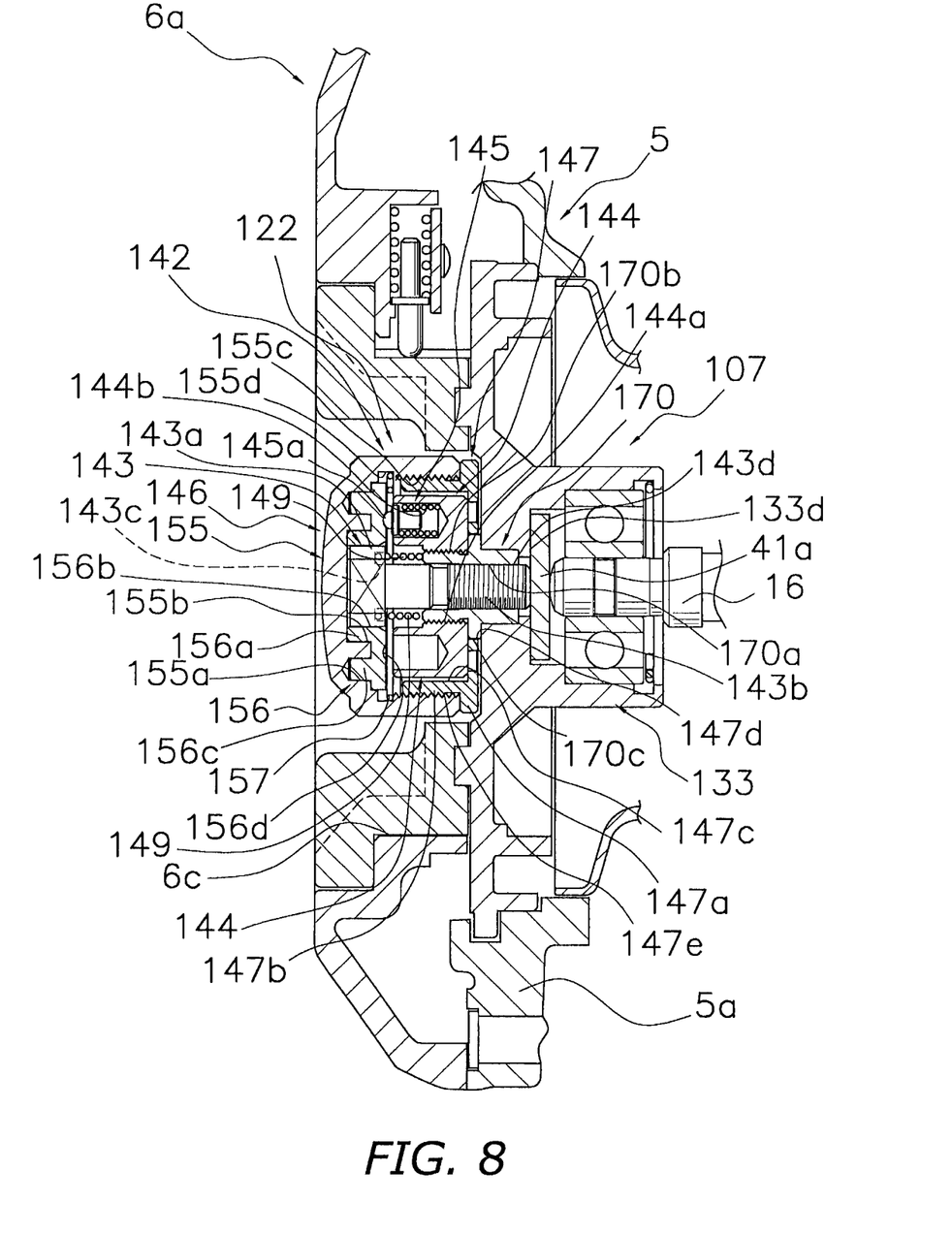
FIG. 8 is a diagram corresponding to FIG. 5 in a second exemplary embodiment of the present invention.
Figure 9:
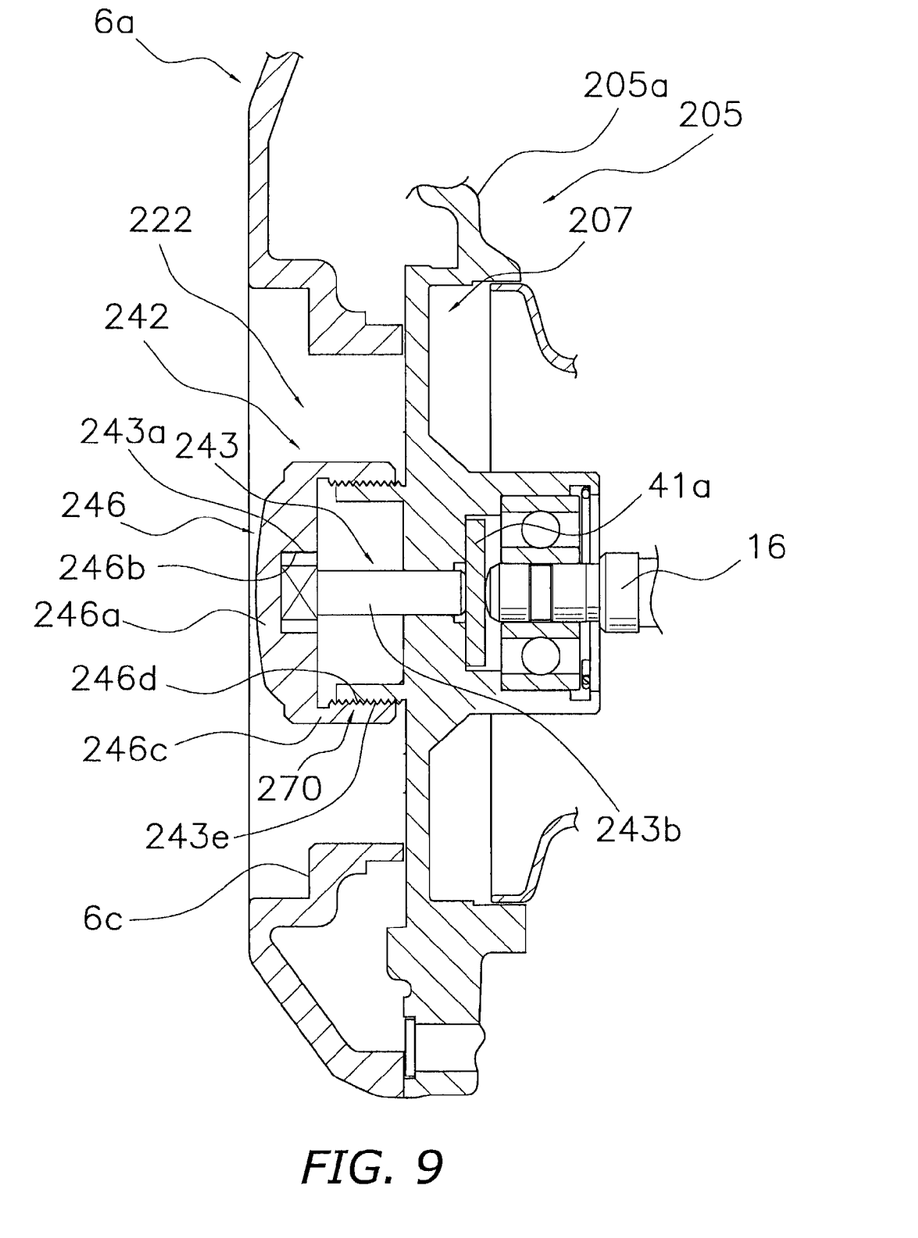
FIG. 9 is a diagram corresponding to FIG. 5 in a third exemplary embodiment of the present invention.

As illustrated in FIG. 9, the casting control mechanism 122 includes a brake knob 142, the first plate 41a, the second plate 41b, and a sound producing mechanism 145 configured to produce sound in response to an operation of the brake knob 142. In the first exemplary embodiment, the brake knob 42 is configured to be axially moved by a rotational operation thereof. In the second exemplary embodiment, however, the brake knob 142 is not configured to be axially moved as illustrated in FIG. 8.

A bearing mounting portion 133 of a shaft support part 107 includes a knob mounting portion 170 fixed to a bottom portion 133d. The knob mounting portion 170 is a tubular member made of metal, for instance, and has a first female threaded portion 170a, a first male threaded portion 170b, and a first brimmed portion 170c. The first female threaded portion 170a, in which the brake knob 142 is screwed, is formed on the inner peripheral surface of one end of the knob mounting portion 170. The first male threaded portion 170b is formed on the outer peripheral surface of the other end of the knob mounting portion 170. The first brimmed portion 170c is a large diameter portion formed between the first female threaded portion 170a and the first male threaded portion 170b. The first male threaded portion 170b is a left-handed screw. A retainer member 144 is attached to the knob mounting portion 170 for retaining the brake knob 142.

The brake knob 142 is engaged with the knob mounting portion 170 while being axially movable and unitarily rotatable therewith. The brake knob 142 is disposed in the recess 6c of the first side cover 6a while being prevented from protruding from the first side cover 6a. In other words, the brake knob 142 is entirely located in the recess 6c. The brake knob 142 includes a screw member 143, a first knob part 146 and a second knob part 147. The first knob part 146 is a closed-end tubular member to be engaged with the screw member 143. The second knob part 147 is fixed to the first knob part 146 while a space is produced between the first knob part 146 and the second knob part 147.

The first knob part 146 includes a main body 155, an engaging member 156 and a retainer spring 157. The knob main body 155 is a closed-end tubular member. The engaging member 156 is engaged with the screw member 143 while being attached to the knob main body 155 in a unitarily rotatable state. The retainer spring 157 prevents the engaging member 156 from being detached from the knob main body 155. For example, the knob main body 155 is a closed-end tubular member made of light metal such as aluminum alloy. The knob main body 155 has a plurality of (e.g., four) coupling holes 155a in the bottom part thereof. The coupling holes 155a are circumferentially aligned at predetermined intervals. The coupling holes 155a serve to couple the engaging member 156 to the knob main body 155 in a unitarily rotatable state. Further, the knob main body 155 has a tubular accommodation recess 155b on the bottom part thereof. The accommodation recess 155b accommodates a boss portion 156a of the engaging member 156 to be described. The knob main body 155 has a second female threaded portion 155c on the inner peripheral surface. The second female threaded portion 155c is screwed onto the second knob part 147. Further, the knob main body 155 has an annular locking groove 155d for hooking the retainer spring 157. The locking groove 155d is disposed on the bottom-side part of the second female threaded portion 155c.

The engaging member 156 is a brimmed cylindrical member made of synthetic resin (e.g., polyacetal, polyamide resin, etc.). The engaging member 156 has the boss portion 156a in the center part thereof. The boss portion 156a protrudes towards the knob main body 155. The boss portion 156a has an engaging hole 156b having a flat oval shape. The engaging hole 156b is engaged with a head portion 143a of the screw member 143 while being axially movable and unitarily rotatable therewith. A plurality of coupling protrusions 156c protrude from the front surface (i.e., the left-side surface in FIG. 8) of the engaging member 156, i.e., the surface opposed to the bottom part of the knob main body 155. The coupling protrusions 156c are fitted into the coupling holes 155a. A plurality of sound producing recesses 156d, forming a part of the sound producing mechanism 145, are formed on the rear surface (i.e., the right-side surface in FIG. 8) of the engaging member 156. The sound producing recesses 156d are circumferentially aligned at predetermined intervals.

The retainer spring 157 is a spring member formed by, for instance, bending an elastic wire rod made of stainless alloy in a hexagonal shape.

The second knob part 147 is rotatably supported by the first brimmed portion 170c of the knob mounting portion 170. The second knob part 147 is a brimmed tubular member having a second brimmed portion 147a and a tubular portion 147b. The second brimmed portion 147a has a large diameter, while the tubular portion 147b has a diameter smaller than that of the second brimmed portion 147a. The second knob part 147 is made of light metal such as aluminum alloy, for instance, and has an accommodation space 147c on the inner peripheral surface of the tubular portion 147b. The accommodation space 147c is a tubular space for accommodating the retainer member 144. The second brimmed portion 147a has an opening 147d in the inner peripheral surface thereof for allowing the first brimmed portion 170c of the knob mounting portion 170 to pass therethrough. On the outer peripheral side of the first brimmed portion 170c, the thickness of the second brimmed portion 147a is less than that of the first brimmed portion 170c. The tubular portion 147b has a second male threaded portion 147e on the outer peripheral surface thereof. The second male threaded portion 147e is screwed into the second female threaded portion 155c of the knob main body 155.

The screw member 143 is a bolt member having the head portion 143a and a threaded shaft portion 143b. The head portion 143a has a large diameter, while the threaded shaft portion 143b protrudes from the head portion 143a. The head portion 143a has a cross-section of a flat oval shape formed by partially cutting out a circle with a pair of parallel lines. The head portion 143a is engaged with the engaging hole 156b of the engaging member 156 while being axially movable and unitarily rotatable therewith. The head portion 143a has a circular-arc shaped locking groove 143c on the threaded shaft portion 143b side surface thereof. One end of a coil spring 149 is locked with the locking groove 143c. The other end of the coil spring 149 is locked with the tip surface of the knob mounting portion 170. The coil spring 149 is attached on the outer peripheral side of the threaded shaft portion 143b while being compressed between the head portion 143a and the knob mounting portion 170. Wobble of the screw member 143 can be inhibited by the coil spring 149. The threaded shaft portion 143b has a third male threaded portion 143d on the tip side outer peripheral surface thereof. The third male threaded portion 143d is screwed into the first female threaded portion 170a. The tip of the threaded shaft portion 143b can make contact with the first plate 41a.

The retainer member 144 is a large-thickness cylindrical member made of light metal such as aluminum alloy, for instance. The retainer member 144 is also a nut member for retaining the second knob part 147 with respect to the knob mounting portion 170 in a rotatable but axially immovable state. The retainer member 144 has a third female threaded portion 144a to be screwed onto the first male threaded portion 170b of the knob mounting portion 170. The third female threaded portion 144a is a left-handed screw similarly to the first male threaded portion 170b. The retainer member 144 is disposed in the accommodation space 147c of the second knob part 147. Accordingly, the retainer member 144 can be fixed to the knob mounting portion 170 while being mounted to the accommodation space 147c. It should be noted that the second knob part 147 can be easily rotated when the retainer member 144 is fixed to the knob mounting portion 170 due to the structure that the thickness of the second brimmed portion 147a is less than that of the first brimmed portion 170c. Further, the retainer member 144 has an attachment hole 144b for accommodating the sound producing mechanism 145. The attachment hole 144b is opposed to the engaging member 156.

The sound producing mechanism 145 includes the aforementioned sound producing recesses 156d, a hitting pin 145a and a coil spring 145b. The sound producing recesses 156d are formed on the engaging member 156. The hitting pin 145a is attached to the attachment hole 144b while being protrudable and retractable. The coil spring 145b urges the hitting pin 145a towards the sound producing recesses 156d. Therefore, the hitting pin 145a urges the engaging member 156 towards the knob main body 155 by the coil spring 145b. As a result, the brake knob 142 is entirely urged by the coil spring 145b in a direction away from the knob mounting portion 170. As illustrated in FIG. 8, the urging force of the coil spring 145b accordingly produces a clearance between the brake knob 142 and the knob mounting portion 170 by the difference between the thickness of the second brimmed portion 147a of the second knob part 147 and the thickness of the first brimmed portion 170c of the knob mounting portion 170. Therefore, the brake knob 142 is prevented from wobbling in the axial direction.

Even in the aforementioned casting control mechanism 122 according to the second exemplary embodiment, the first knob part 146 of the brake knob 142 is turned, for instance, in the clockwise direction. The screw member 143 accordingly proceeds rightwards in FIG. 8 and an interval is reduced between the first plate 41a and the second plate 41b. The braking force acting on the spool shaft 16 is thereby increased. When the first knob part 146 is turned in the counterclockwise direction, in contrast, the braking force of the screw member is reduced.

Even thus configured second exemplary embodiment can achieve advantageous effects similar to those achieved by the first exemplary embodiment. Further, the first knob part 146 of the brake knob 142 is not axially moved even when being turned and operated. Therefore, foreign substance and etc. are prevented from easily entering the inside of the brake knob 142.

Third Exemplary Embodiment

In the first and second exemplary embodiments, the shaft support part 7 or 107 is detachably attached to the first side plate 5a of flame 5. In a third exemplary embodiment, in contrast, a shaft support part 207 is integrally formed with a first side plate 205a of the flame 205 as illustrated in FIG. 9. Therefore, the shaft support part 207 does not have an attachment-detachment operating portion. Further, the shaft support part 207 has a tubular knob mounting portion 270 on the outer surface thereof.

A casting control mechanism 222 includes a brake knob 242, the first plate 41a, and the second plate 41b. The brake knob 242 is disposed in the recess 6c of the first side cover 6a while being prevented from protruding from the first side cover 6a. In other words, the brake knob 242 is entirely located in the recess 6c. The brake knob 242 includes a shaft member 243 and a closed-end tubular knob part 246 engaged with the shaft member 243.

The knob part 246 has an engaging hole 246b in the center part of the bottom portion 246a thereof. The engaging hole 246b is a flat oval hole to be engaged with a head portion 243a of the shaft member 243 while being axially movable and unitarily rotatable therewith. Further, the knob part 246 has a female threaded portion 246d on the inner peripheral surface of a tubular portion 246c thereof. The female threaded portion 243d is screwed onto a male threaded portion 243e.

The shaft member 243 has the head portion 243a and a shaft portion 243b. The head portion 243a has a large diameter, while the shaft portion 243b protrudes from the head portion 243a. The head portion 243a has a cross-section having a flat oval shape formed by partially cutting out a circle with a pair of parallel lines. The head portion 243a is engaged with the engaging hole 246b of the knob part 246 while being axially movable and unitarily rotatable therewith. The tip of the shaft portion 243b can make contact with the first plate 41a.

In the third exemplary embodiment, attachment-detachment of the spool can be executed by attachment-detachment of the second side cover 6b.

Even thus configured third exemplary embodiment can achieve advantageous effects similar to those achieved by the first exemplary embodiment.

Features

The aforementioned exemplary embodiment can be expressed as follows.

(A) The dual-bearing reel includes the reel unit 1, the handle 2, the spool shaft 16, the spool 12, and the casting control mechanism 22. The reel unit 1 includes the frame 5, the first side cover 6a, the second side cover 6b, and the shaft support part 7. The first side cover 6a has the recess 6c and covers the first side of the frame 5. The second side cover 6b covers the second side of the frame 5. The shaft support part 7 is mounted on the frame 5 on the first side cover 6a side. The handle 2 is rotatably supported by the reel unit 1 on the second side cover 6b side. One end of the spool shaft 16 is rotatably supported by the shaft support part 7. The spool 12 is mounted onto the spool shaft 16 while being configured to be rotated in conjunction with rotation of the handle 2. The casting control mechanism 22 includes the brake knob 42, the first plate 41a, and the second plate 41b. The brake knob 42 is rotatably supported by the shaft support part 7. Further, the brake knob 42 is disposed in the recess 6c while being prevented from protruding from the first side cover 6a. In other words, the brake knob 42 is entirely located in the recess 6c The first plate 41a is disposed for making contact with the brake knob 42 and the first end surface 16a of the spool shaft 16. The first plate 41a is configured to be pressed in conjunction with rotation of the brake knob 42. The second plate 41b can make contact with the second end surface 16b of the spool shaft 16.

In the dual-bearing reel, the first side cover 6a, which is disposed on the opposite side of the handle 2 attachment side of the reel unit 1, has the recess 6c. Further, the brake knob 42 is disposed in the recess 6c while being prevented from protruding from the first side cover 6a. In other words, the brake knob 42 is entirely located in the recess 6c Therefore, even in palming the first side cover 6a side, the brake knob 42 does not make contact with an angler's palm. Accordingly, palming can be easily performed on the opposite side of the handle 2 attachment side.

(B) In the dual-bearing reel, the brake knob 42 is a circular member and the outer peripheral surface thereof is disposed away from the recess 6c at a clearance for operation. In this case, a clearance is produced between the outer peripheral surface of the brake knob 42 and the recess 6c. Therefore, a brake operation can be executed on the outer peripheral surface of the brake knob 42. In other words, the brake knob 42 can be easily rotated.

(C) In the dual-bearing reel, the shaft support part 7 is detachably attached to the frame 5. In this case, the spool 12 can be taken out to the outside by detaching the shaft support part 7 due to the structure that the shaft support part 7 is detachably attached to the frame 5.

(D) In the dual-bearing reel, the shaft support part 7 includes the attachment-detachment operating portion 34 disposed on the outer peripheral side of the brake knob 42. In this case, an attachment-detachment operation of the shaft support part 7 can be easily done.

(E) In the dual-bearing reel, the shaft support part 207 is integrally formed with the first side plate 205a of the frame 205. In this case, the spool shaft 16 can be accurately supported due to the structure that the frame 205 and the shaft support part 207 are integrally formed.

(F) In the dual-bearing reel, the brake knob 42 includes the circular operating portion 42a, the seal attachment portion 42b, and the male threaded portion 42c. The seal attachment portion 42b has a diameter smaller than that of the operating portion 42a. The male threaded portion 42c has a diameter smaller than that of the seal attachment portion 42b. The shaft support part 7 includes the seal arrangement portion 33g, the female threaded portion 33e, and the bottom portion 33d. The seal arrangement portion 33g is a portion that the seal attachment portion 42b is disposed on the inner peripheral side thereof. The female threaded portion 33e is a portion that the male threaded portion 42c is screwed. The bottom portion 33d is a portion that the first plate 41a is attached. The dual-bearing reel further includes the O-ring 43. The O-ring 43 is disposed between the seal arrangement portion 33g and the seal attachment portion 42b while making contact with them.

In this case, liquid is prevented from easily entering the bearing side through the clearance between the brake knob 42 and the shaft support part 7 due to the structure that the O-ring 43 is disposed between the seal attachment portion 42b and the seal arrangement portion 33g.

Other Exemplary Embodiments (a) In the aforementioned exemplary embodiments, a manual dual-bearing reel has been exemplified. However, the present invention can be applied to an electric dual-bearing reel. Further, the present invention can be applied to a dual-bearing reel with a handle configured to be rotated in the fishing-line releasing direction. Furthermore, the right handled dual-bearing reel has been exemplified. However, the present invention can be also applied to a left handled dual-bearing reel.

(b) The rib for an attachment-detachment operation can extends for covering the brake knob 42. With the structure, the brake knob can be prevented from coming off. In this case, the first cover desirably has a curved surface formed along the shape of the palm of the hand palming it, and the rib for an attachment-detachment operation desirably has a curved surface continued to the curved surface of the first cover. With the structure, the brake knob itself can keep a shape for allowing an angler to easily execute palming without protruding from the curved surface as a conceptual surface of the first cover.

Further, the exposed area of the brake knob itself can be increased for allowing an angler to easily operate it.

Figure 10:
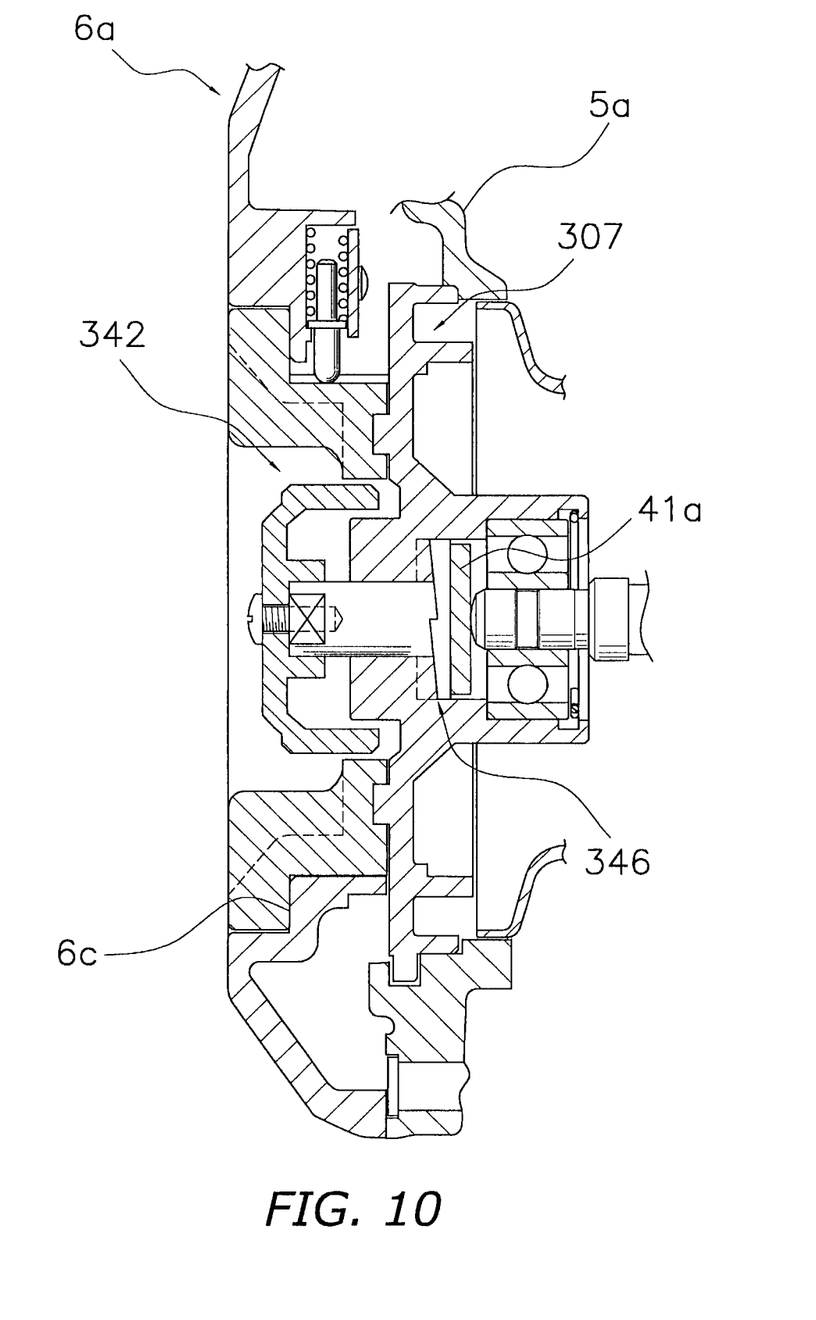
FIG. 10 is a diagram corresponding to FIG. 5 in another exemplary embodiment of the present invention.

(c) In the exemplary embodiment, the brake knob 42 is screwed onto the shaft support part 7. However, the structure of the brake knob is not limited to the above. The brake knob can be arbitrarily structured as long as it can press the first plate 41a while being rotatably supported by the shaft support part. For example, as illustrated in FIG. 10, a shaft portion of a brake knob 342 is rotatably attached onto a shaft support part 307, and further, a cam portion 346 is provided. The cam portion 346 has a slope and is axially movable in conjunction with rotation of the brake knob 342. Rotation of the brake knob 342 may be configured to be converted into axial movement by the cam portion 346, and the first plate 41a may be thereby configured to be pressed.

Advantageous Effects of Invention

According to the present invention, the brake knob is disposed in the recess of the first cover disposed on the opposite side of the handle attachment side while being prevented from protruding from the first cover. Therefore, the brake knob does not make contact with the palm of an angler even in palming the first cover side. Accordingly, palming can be easily performed on the opposite side of the handle attachment side.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel, comprising:
    a reel unit including
        a frame,
        a first cover having a recess, the first cover covering a first side of the frame,
        a second cover covering a second side of the frame, and
        a shaft support part attached to the frame on a first cover side;
    a handle rotatably supported by the reel unit on a second cover side;
    a spool shaft rotatably supported at an end thereof by the shaft support part, the spool shaft having two end surfaces;
    a spool mounted onto the spool shaft, the spool being configured to be rotated in conjunction with rotation of the handle; and
    a casting control mechanism including
        a brake knob rotatably supported by the shaft support part, the brake knob being disposed entirely in the recess,
        a first plate being disposed to be contactable with the brake knob and one of the end surfaces of the spool shaft, the first plate being configured to be pressed in conjunction with rotation of the brake knob, and
        a second plate being dispensed to be contactable with the other of the end surfaces of the spool shaft.

2. The dual-bearing reel according to claim 1, wherein the brake knob is a circular member, and
the brake knob has an outer peripheral surface being disposed away from a peripheral wall of the recess at a clearance for operation.

3. The dual-bearing reel according to claim 1, wherein the shaft support part is detachably attached to the frame.

4. The dual-bearing reel according to claim 3, wherein the shaft support part has an attachment-detachment operating portion being disposed on an outer peripheral side of the brake knob.

5. The dual-bearing reel according to claim 1, wherein the shaft support part is integrally formed with the frame.

6. A dual-bearing reel, comprising:
    a reel unit including
        a frame,
        a first cover having a recess, the first cover covering a first side of the frame,
        a second cover covering a second side of the frame, and
        a shaft support part attached to the frame on a first cover side;
    a handle rotatably supported by the reel unit on a second cover side;
    a spool shaft rotatable supported at an end thereof by the shaft support part, the spool shaft having two end surfaces;
    a spool mounted onto the spool shaft, the spool being configured to be rotated in conjunction with rotation of the handle; and
    a casting control mechanism including
        a brake knob rotatably supported by the shaft support part, the brake knob being disposed entirely in the recess,
        a first plate being disposed to be contactable with the brake knob and one of the end surfaces of the spool shaft, the first plate being configured to be pressed in conjunction with rotation of the brake knob, and
    a second plate being dispensed to be contactable with the other of the end surfaces of the spool shaft,
    the brake knob including
        a circular operating portion,
        a seal attachment portion having a diameter smaller than a diameter of the operating portion, and
        a male threaded portion having a diameter smaller than the diameter of the seal attachment portion,
    the shaft support part including
        a seal arrangement portion for disposing the seal attachment portion on an inner peripheral side thereof,
        a female threaded portion allowing the male threaded portion to be screwed therein, and a bottom portion allowing the first plate to be mounted thereon,
the dual-bearing reel further including a seal member, and
the seal member being configured to make contact with the seal attachment portion and the seal arrangement portion while being disposed therebetween.

\* \* \* \* \*